US00RE48819E

(19) United States
(12) Reissued Patent
Altmejd et al.

(10) Patent Number: US RE48,819 E
(45) Date of Reissued Patent: *Nov. 16, 2021

(54) PERFORMANCE AND POWER OPTIMIZATION VIA BLOCK ORIENTED PERFORMANCE MEASUREMENT AND CONTROL

(71) Applicant: Advanced Micro Devices, Inc., Sunnyvale, CA (US)

(72) Inventors: Morrie Altmejd, Austin, TX (US); Evandro Menezes, Austin, TX (US); Dave Tobias, Pflugerville, TX (US)

(73) Assignee: Advanced Micro Devices, Inc., Sunnyvale, CA (US)

( * ) Notice: This patent is subject to a terminal disclaimer.

(21) Appl. No.: 16/028,942

(22) Filed: Jul. 6, 2018

Related U.S. Patent Documents

Reissue of:
(64) Patent No.: 6,895,520
Issued: May 17, 2005
Appl. No.: 09/798,176
Filed: Mar. 2, 2001

U.S. Applications:
(63) Continuation of application No. 15/217,563, filed on Jul. 22, 2016, now Pat. No. Re. 47,420, which is an application for the reissue of Pat. No. 6,895,520.

(51) Int. Cl.
*G06F 1/32* (2019.01)
*G06F 1/26* (2006.01)
(Continued)

(52) U.S. Cl.
CPC ..... *G06F 1/329* (2013.01); *G06F 1/3203* (2013.01); *G06F 1/3228* (2013.01); *Y02D 10/00* (2018.01)

(58) Field of Classification Search
CPC ..... G06F 1/3234; G06F 1/324; G06F 1/3287; G06F 1/3296; G06F 1/3203; G06F 1/3228; G06F 1/329; Y02D 10/24
(Continued)

(56) References Cited

U.S. PATENT DOCUMENTS 4,544,950 A 10/1985 Tu
4,745,402 A 5/1988 Auerbach
(Continued)

FOREIGN PATENT DOCUMENTS

CN 1154629 A 7/1997
EP 0594240 A2 4/1994
(Continued)

OTHER PUBLICATIONS

IBM Technical Disclosure Bulletin "Power Management Clock Change for 603 Processor", vol. 38, No. 12, Dec. 1995; 5 pages.
(Continued)

*Primary Examiner* — Matthew E Heneghan
(74) *Attorney, Agent, or Firm* — Sterne, Kessler, Goldstein & Fox P.L.L.C.

(57) ABSTRACT

An integrated circuit includes a plurality of functional blocks. Utilization information for the various functional blocks is generated. Based on that information, the power consumption and thus the performance levels of the functional blocks can be tuned. Thus, when a functional block is heavily loaded by an application, the performance level and thus power consumption of that particular functional block is increased. At the same time, other functional blocks that are not being heavily utilized and thus have lower performance requirements can be kept at a relatively low power consumption level. Thus, power consumption can be reduced overall without unduly impacting performance.

15 Claims, 3 Drawing Sheets

(51) Int. Cl.
*G06F 1/329* (2019.01)
*G06F 1/3203* (2019.01)
*G06F 1/3228* (2019.01)

(58) Field of Classification Search
USPC ..... 713/300, 320, 322, 324
See application file for complete search history.

(56) References Cited

U.S. PATENT DOCUMENTS 4,821,261 A 4/1989 Pommier
4,833,601 A 5/1989 Barlow et al.
4,843,568 A 6/1989 Krueger et al.
4,924,428 A * 5/1990 Vea ..... 714/1
4,926,353 A * 5/1990 Groezinger ..... 702/182
5,142,684 A 8/1992 Perry et al.
5,146,210 A 9/1992 Heberle
5,241,428 A 8/1993 Goldwasser et al.
5,280,530 A 1/1994 Trew et al.
5,307,003 A 4/1994 Fairbanks et al.
5,327,160 A 7/1994 Asher
5,333,296 A 7/1994 Bouchard et al.
5,396,635 A 3/1995 Fung
5,418,969 A 5/1995 Matsuzaki et al.
5,423,045 A 6/1995 Kannan et al.
5,436,639 A 7/1995 Arai et al.
5,436,676 A 7/1995 Pint et al.
5,438,372 A 8/1995 Tsumori et al.
5,451,892 A 9/1995 Bailey
5,490,059 A 2/1996 Mahalingaiah et al.
5,502,838 A 3/1996 Kikinis
5,511,203 A 4/1996 Wisor et al. ..... 395/750
5,511,205 A 4/1996 Kannan et al.
5,517,250 A 5/1996 Hoogenboom et al.
5,517,257 A 5/1996 Dunn et al.
5,521,922 A 5/1996 Fujinami et al.
5,528,263 A 6/1996 Platzker et al.
5,528,304 A 6/1996 Cherrick et al.
5,528,698 A 6/1996 Kamei et al.
5,532,753 A 7/1996 Buchner et al.
5,534,917 A 7/1996 MacDougall
5,545,857 A 8/1996 Lee et al.
5,563,988 A 10/1996 Maes et al.
5,570,108 A 10/1996 McLauehlin et al.
5,589,893 A 12/1996 Gaughan et al.
5,592,679 A 1/1997 Yung
5,594,469 A 1/1997 Freeman et al.
5,613,152 A 3/1997 Van Meerbergen et al.
5,621,456 A 4/1997 Florin et al.
5,654,748 A 8/1997 Matthews, III et al.
5,675,358 A 10/1997 Bullock et al.
5,682,511 A 10/1997 Sposato et al.
5,696,985 A 12/1997 Crump et al.
5,713,030 A 1/1998 Evoy
5,719,800 A * 2/1998 Mittal et al. ..... 713/321
5,721,829 A 2/1998 Dunn et al.
5,729,280 A 3/1998 Inoue et al.
5,737,029 A 4/1998 Ohkura et al.
5,745,375 A 4/1998 Reinhardt et al. ..... 364/492
5,751,373 A 5/1998 Ohyama et al.
5,754,436 A 5/1998 Walsh et al.
5,754,837 A 5/1998 Walsh et al.
5,774,591 A 6/1998 Black et al.
5,774,704 A 6/1998 Williams
5,778,237 A 7/1998 Yamamoto et al.
5,781,247 A 7/1998 Wehmeyer et al.
5,781,780 A 7/1998 Walsh et al.
5,781,783 A * 7/1998 Gunther ..... G06F 9/3869 713/320
5,784,628 A 7/1998 Reneris
5,784,630 A 7/1998 Saito et al.
5,790,877 A 8/1998 Nishiyama et al.
5,793,980 A 8/1998 Glaser et al.
5,798,667 A 8/1998 Herbert
5,808,690 A 9/1998 Rich
5,812,860 A 9/1998 Horden et al. ..... 395/750.04
5,828,370 A 10/1998 Moeller et al.
5,828,895 A 10/1998 Chan et al.
5,832,284 A 11/1998 Michail et al.
5,838,578 A 11/1998 Pippin
5,845,132 A 12/1998 Walsh et al.
5,850,218 A 12/1998 LaJoie et al.
5,850,470 A 12/1998 Kung et al.
5,852,737 A 12/1998 Bikowsky ..... 395/750.05
5,873,000 A 2/1999 Lin et al. ..... 395/892
5,881,245 A 3/1999 Thompson
5,881,298 A 3/1999 Cathey ..... 395/750.06
5,884,049 A 3/1999 Atkinson ..... 395/281
5,886,690 A 3/1999 Pond et al.
5,887,179 A 3/1999 Halahmi et al. ..... 395/750.06
5,898,849 A 4/1999 Tran
5,920,572 A 7/1999 Washington et al.
5,923,755 A 7/1999 Birch
5,925,133 A 7/1999 Buxton et al. ..... 713/323
5,930,444 A 7/1999 Camhi et al.
5,940,785 A 8/1999 Georgiou et al.
5,958,055 A * 9/1999 Evoy et al. ..... 713/310
5,958,058 A 9/1999 Barrus ..... 713/320
5,968,167 A 10/1999 Whittaker et al.
5,973,704 A 10/1999 Nishiumi et al.
5,974,557 A 10/1999 Thomas et al.
5,978,864 A 11/1999 Hetherington et al.
5,978,923 A * 11/1999 Kou ..... 713/323
5,987,244 A 11/1999 Kau et al.
5,996,083 A 11/1999 Gupta et al.
6,014,611 A 1/2000 Arai et al. ..... 702/132
6,020,912 A 2/2000 De Lang
6,026,186 A 2/2000 Fan
6,047,248 A 4/2000 Georgiou et al.
6,073,244 A 6/2000 Iwazaki ..... 713/322
6,076,171 A 6/2000 Kawata ..... 713/501
RE36,839 E 8/2000 Simmons et al. ..... 326/93
6,105,127 A 8/2000 Kimura et al.
6,105,142 A 8/2000 Goff et al.
6,108,033 A 8/2000 Ito et al.
6,111,517 A 8/2000 Atick et al.
6,111,584 A 8/2000 Murphy
6,119,241 A 9/2000 Michail et al.
6,122,676 A 9/2000 Brief et al.
6,128,653 A 10/2000 del Val et al.
6,128,745 A 10/2000 Anderson et al. ..... 713/323
6,141,003 A 10/2000 Chor et al.
6,141,762 A 10/2000 Nicol et al.
6,147,714 A 11/2000 Terasawa et al.
6,151,059 A 11/2000 Schein et al.
6,151,681 A 11/2000 Roden et al. ..... 713/322
6,184,877 B1 2/2001 Dodson et al.
6,185,314 B1 2/2001 Crabtree et al.
6,185,641 B1 2/2001 Dunnihoo
6,191,773 B1 2/2001 Maruno et al.
6,195,753 B1 2/2001 Nakamura
6,208,361 B1 3/2001 Gossett
6,219,723 B1 * 4/2001 Hetherington et al. ..... 710/18
6,226,447 B1 5/2001 Sasaki et al.
6,233,389 B1 5/2001 Barton et al.
6,239,810 B1 5/2001 Van Hook et al.
6,252,598 B1 6/2001 Segen
6,252,878 B1 * 6/2001 Locklear et al. ..... 370/401
6,256,743 B1 7/2001 Lin
6,266,715 B1 7/2001 Loyer et al.
6,275,782 B1 8/2001 Mann
6,295,321 B1 9/2001 Lyn
6,311,287 B1 10/2001 Dischler et al.
6,323,911 B1 11/2001 Schein et al.
6,327,418 B1 12/2001 Barton
6,345,362 B1 2/2002 Bertin et al.
6,353,628 B1 * 3/2002 Wallace et al. ..... 375/220
6,363,490 B1 3/2002 Senyk
6,397,000 B1 5/2002 Hatanaka et al.
6,407,595 B1 6/2002 Huang et al.
6,421,463 B1 7/2002 Poggio et al.
6,425,086 B1 * 7/2002 Clark ..... G06F 1/324 713/322
6,442,700 B1 * 8/2002 Cooper ..... 713/320
6,470,290 B1 10/2002 Lee et al.

(56) References Cited

U.S. PATENT DOCUMENTS 6,490,000 B1 12/2002 Schaefer et al.
6,510,400 B1 1/2003 Moriyama
6,513,124 B1 1/2003 Furuichi et al.
6,535,798 B1 3/2003 Bhatia et al.
6,535,905 B1 3/2003 Kalafatis et al.
6,542,621 B1 4/2003 Brill et al.
6,545,683 B1 4/2003 Williams
6,564,328 B1 * 5/2003 Grochowski et al. ..... 713/320
6,564,329 B1 * 5/2003 Cheung ..... G06F 1/324 713/322
6,573,900 B1 6/2003 Lindholm et al.
6,591,058 B1 7/2003 O'Connor et al.
6,608,476 B1 * 8/2003 Mirov ..... G06F 1/08 324/103 R
6,630,935 B1 10/2003 Taylor et al.
6,636,635 B2 10/2003 Matsugu
6,636,976 B1 * 10/2003 Grochowski et al. ..... 713/320
6,639,998 B1 10/2003 Lee et al.
6,647,502 B1 11/2003 Ohmori
6,650,327 B1 11/2003 Airey et al.
6,711,447 B1 3/2004 Saeed
6,717,599 B1 4/2004 Olano
6,724,825 B1 4/2004 Nemiroff et al.
6,724,915 B1 4/2004 Toklu et al.
6,728,862 B1 4/2004 Wilson
6,731,289 B1 5/2004 Peercy et al.
6,762,797 B1 7/2004 Pelletier
6,784,879 B1 8/2004 Orr
6,788,710 B1 9/2004 Knutson et al.
6,789,037 B2 9/2004 Gunther et al.
6,804,632 B2 10/2004 Orenstien et al.
6,825,843 B2 11/2004 Allen et al.
6,829,713 B2 * 12/2004 Cooper et al. ..... 713/320
6,845,456 B1 1/2005 Menezes et al.
6,859,882 B2 2/2005 Fung
6,889,332 B2 5/2005 Helms et al.
6,897,871 B1 5/2005 Morein et al.
6,901,522 B2 5/2005 Buch
6,922,783 B2 7/2005 Knee et al.
6,928,559 B1 8/2005 Beard
6,952,520 B1 10/2005 Shigaki
6,954,204 B2 10/2005 Zatz et al.
6,976,182 B1 12/2005 Filippo
6,978,389 B2 12/2005 Jahnke
7,015,913 B1 3/2006 Lindholm et al.
7,024,100 B1 4/2006 Furuyama
7,028,196 B2 4/2006 Soltis, Jr. et al.
7,038,685 B1 5/2006 Lindholm
7,039,755 B1 5/2006 Helms
7,051,306 B2 5/2006 Hoberman et al.
7,081,895 B2 7/2006 Papakipos et al.
7,085,945 B2 8/2006 Silvester
7,095,945 B1 8/2006 Kovacevic
7,100,056 B2 8/2006 Barr et al.
7,100,060 B2 8/2006 Cai et al.
7,100,061 B2 8/2006 Halepete et al.
7,134,031 B2 11/2006 Flautner
7,144,152 B2 12/2006 Rusu et al.
7,174,194 B2 2/2007 Chauvel et al.
7,174,467 B1 2/2007 Helms et al.
7,197,229 B2 3/2007 Hatanaka et al.
7,206,966 B2 4/2007 Barr et al.
7,216,064 B1 5/2007 Pippin
7,233,335 B2 6/2007 Moreton et al.
7,249,268 B2 7/2007 Bhandarkar
7,272,298 B1 9/2007 Lang et al.
7,313,706 B2 12/2007 Williams et al.
7,321,369 B2 1/2008 Wyatt et al.
7,327,369 B2 2/2008 Morein et al.
7,363,472 B2 4/2008 Stuttard et al.
7,366,407 B2 4/2008 Hallberg et al.
7,376,848 B2 5/2008 Beard
7,428,645 B2 9/2008 O'Connor et al.
7,437,581 B2 10/2008 Grochowski et al.
7,475,175 B2 1/2009 Klein et al.
7,502,948 B2 3/2009 Rotem et al.
7,516,334 B2 4/2009 Suzuoki et al.
7,529,465 B2 5/2009 Barton et al.
7,587,262 B1 9/2009 Pippin
7,636,863 B2 12/2009 Oh
7,664,971 B2 2/2010 Oh
7,673,304 B2 3/2010 Gosalia et al.
7,742,053 B2 6/2010 Lefebvre et al.
7,966,511 B2 6/2011 Naveh et al.
RE43,184 E 2/2012 Lee et al.
8,285,109 B2 10/2012 Sasaki et al.
8,463,110 B2 6/2013 O'Connor
RE47,420 E * 6/2019 Altmejd ..... G06F 1/329
2001/0003206 A1 6/2001 Pole, II et al.
2002/0054146 A1 5/2002 Fukumoto et al.
2002/0112193 A1 8/2002 Altman et al.
2003/0030326 A1 2/2003 Shenai et al.
2003/0110012 A1 6/2003 Orenstien et al.
2003/0122429 A1 7/2003 Zhang et al.
2003/0188208 A1 10/2003 Fung
2003/0188212 A1 10/2003 Kahn et al.
2004/0003301 A1 1/2004 Nguyen
2004/0117678 A1 6/2004 Soltis, Jr. et al.
2004/0260958 A1 12/2004 Issa et al.
2005/0046400 A1 3/2005 Rotem

FOREIGN PATENT DOCUMENTS

EP 0632360 A1 1/1995
EP 0737006 B2 10/1996
EP 0737007 A2 10/1996
EP 0762769 B1 3/1997
EP 0840504 A1 5/1998
EP 0594240 B1 1/2000
EP 1039750 A2 9/2000
JP 05-252439 9/1993
JP 06-153017 5/1994
JP 06-217271 8/1994
JP 07-154626 6/1995
JP 07-222027 8/1995
JP 07-281666 10/1995
JP 08-106421 4/1996
JP 08-328698 12/1996
JP 08-331415 12/1996
JP 09-006947 1/1997
JP 09-167260 6/1997
JP 2000-10673 A 1/2000
KR 100185947 12/1998
KR 100191731 1/1999
KR 100301826 6/2001
WO WO 9719560 5/1997
WO WO 9919805 4/1999

OTHER PUBLICATIONS

"Analogue Dialogue, a forum for the exchange of circuits, systems, and software for real-world signal processing," vol. 34, Analog Devices, Inc., 2000; 58 pages.
Marculescu, et al., "Adaptive Program Execution for Low Power in Superscalar Processors," University of Maryland, Department of Electrical and Computer Engineering, Oct. 1999; 13 pages.
Bellosa, F., "OS-Directed Throttling of Processor Activity for Dynamic Power Management," Technical Report, Friedrich-Alexander-University, Computer Science Department, Jun. 1999; 7 pages.
Excerpts from Panda, et al., Power-efficient Design, New York: Springer, 2010; pp. 11-39.
Horowitz, et al., "Low-Power Digital Design," IEEE Symposium on Low Power Electronics, 1994; pp. 8-11.
Excerpt from the IBM Dictionary of Computing, International Business Machines Corporation, 1994; p. 108.
Wagner, K, "Clock System Design," IEEE Design & Text of Computers, vol. 5, Issue 5, Oct. 1988; pp. 9-27.
Excerpt from The Authoritative Dictionary of IEEE Standards Terms, Seventh Edition, 2000; pp. 458-459.
Benini, et al., "A Survey of Design Techniques for System-Level Dynamic Power Management," IEEE Transaction on Very Large Scale Integration (VLSI) Systems, vol. 8, No. 3, Jun. 2000; pp. 299-316.

(56) References Cited

OTHER PUBLICATIONS

Lu, et al., "Operating-System Directed Power Reduction," Proceedings of the 2000 International Symposium on Low Power Electronics and Design, 2000; pp. 37-42.
Microprocessor Quick Reference Guide, Intel Corporation, accessible at http://www.intel.com/pressroom/kits/quickrefyr.htm. last accessed Aug. 4, 2016; 34 pages.
Intel Corporation 1990 Annual Report, Order No. 240946-001, Intel Corporation, 1990; 34 pages.
Lewis, P., "Personal Computers; Innovative Portables From Zenith," New York Times, May 21, 1991; 3 pages.
EPC-21/22 Hardware Reference, Radisys Corporation, Aug. 1993; 55 pages.
Laird, D., "Crusoe Processor Products and Technology," PowerPoint Presentation, Transmeta Corporation, Jan. 19, 2000; 23 pages.
"Transmeta Breaks the Silence, Unveils Smart Processor to Revolutionize Mobile Internet Computing," Crusoe Press Release, Jan. 19, 2000, archived by the Internet Archive on Aug. 17, 2000 at https://web.archive.org/web/20000817082320/http://www.transmeta.com/press/011900-1.html; 3 pages.
"Notebooks with Transmeta chip arrive in U.S.," CNET, Jan. 2, 2002, accessible at http://www.cnet.com/news/notebooks-with-transmeta-chip-arrive-in-u-s; 6 pages.
Quan, M., "Notebooks try on Crusoe processor at PC Expo," EE Times, Jun. 30, 2000, accessible at http://www.eetimes.com/document.asp?doc_id=1141693&print=yes; 3 pages.
Klaiber, A., "The Technology Behind Crusoe Processors, Low-Power x86-Compatible Processors Implemented with Code Morphing Software," Transmeta Corporation, Jan. 2000; 18 pages.
Fleischmann, M., "LongRung Power Management, Dynamic Power Management for Crusoe Processors," Transmeta Corporation, Jan. 17, 2001; 18 pages.
Halfhill, T., "Top PC Vendors Adopt Crusoe," Cahners Microprocessor Report, Jul. 10, 2000; 6 pages.
Geppert, et al., "Transmeta's Magic Show," IEEE Spectrum, May 2001; 8 pages.
Halfhill, T., "Transmeta Breaks x86 Low-Power Barrier," Cahners Microprocessor Report, Feb. 14, 2000; 11 pages.
Fleischmann, M., "Crusoe Power Management: Cutting x86 Operating Power Through LongRun," PowerPoint Presentation, 12th Hot Chips Symposium, Aug. 15, 2000; 21 pages.
Gervasi, B., "DDR SDRAM, the Memory of Choice for Mobile Computing," PowerPoint Presentation, Computex 2000 Conference, Jun. 2000; 22 pages.
"Our History," AMD, Inc., accessible at http://www.amd.com/en-us/who-we-are/corporate-information/history, last accessed Aug. 4, 2016; 16 pages.
"AMD PowerNow! Technology Dynamically Manages Power and Performance," AMD, Inc., Informational White Paper, Publication No. 24404, Rev. A, Nov. 2000; 18 pages.
"AMD Introduces 0.18 Micron Mobile AMD-K6-III+ and Mobile AMD-K6-2+ Processors," AMD, Inc., Press Release, Apr. 18, 2000, archived by the Internet Archive on Jun. 17, 2000, at https://web.archive.org/web/20000617082528/http://www.amd.com/news/prodpr/20083.html; 2 pages.
"AMD Boosts Battery Life for Notebook Computers with AMD PowerNow! Technology," AMD, Inc., Press Release, Jun. 26, 2000, archived by the Internet Archive on Aug. 15, 2000, at https://web.archive.org/web/20000815210041/http://www.amd.com/news/prodpr/20119.html; 2 pages.
"AMD Introduces Powerful and Power Friendly AMD-K6-2E+, AMD-K6-IIIE+ Embedded Processors," AMD, Inc., Press Release, Sep. 25, 2000, archived by the Internet Archive on Oct. 17, 2000, at https://web.archive.org/web/20001017162155/http://www.amd.com/news/prodpr/20138.html; 3 pages.
Fleischmann, M., "Crusoe Power Management: Cutting x86 Operating Power Through LongRun," PowerPoint Presentation, Nikkei Electronics Design Conference 2000, May 30, 2000; 18 pages.
"Introduction to the Intel386 SL Microprocessor SuperSet Technical Overview," Intel Corporation, Order No. 2408952-002, 1991; 99 pages.
Crusoe Processor Model TM5400, Transmeta Corporation, Jan. 18, 2000; 7 pages.
"AMD PowerNow! Technology Platform Design Guide for Embedded Processors, Application Note," AMD, Inc., Publication No. 24267, Rev. A, Dec. 2000.
Technical Reference Guide, Compaq LTE Lite Family of Personal Computers, Nov. 1992, Part No. 140097-001; 343 pages.
"AMD-K6-IIIE+ Embedded Processor Data Sheet," AMD, Inc., Publication No. 23543, Rev. A, Sep. 2000; 370 pages.
"Mobile AMD-K6-2+ Processor Data Sheet," AMD, Inc., Publication No. 23446, Rev. B, Jul. 2000; 332 pages.
"Intel 386 SL Microprocessor SuperSet Programmer's Reference Manual," Order No. 240815-001, Intel Corporation, 1990; 468 pages.
"Advanced Power Configuration and Power Interface Specification," Revision 2.0, Compaq Computer Corporation, Intel Corporation, Microsoft Corporation, Phoenix Technologies, Ltd., Toshiba Corporation, Jul. 27, 2000; 481 pages.
Burd, et al., "WA 17.4 A Synamic Voltage Scaled Microprocessor System," IEEE International Solid-State Circuits Conference, 2000; 3 pages.
"AMD-762 System Controller Data Sheet," AMD, Inc., Publication No. 24416, Rev. C, Dec. 2001; 122 pages.
Marculescu, D., "Application-Driven Processor Design Exploration for Power-Performance Trade-off Analysis," IEEE International Conference on Computer-Aided Design, 2001; pp. 306-313.
Iyer, et al., "Power Aware Microarchitecture Resource Scaling," Proceedings of the Conference and Exhibition on Design, Automation, and Test in Europe, Mar. 13-16, 2001; pp. 190-196.
Pering, et al., "The Simulation and Evaluation of Dynamic Voltage Scaling Algorithms," Proceedings of the International Symposium on Low Power Electronics and Design, Aug. 10-12, 1998; pp. 76-81.
Crusoe Processor Model TM5800, Transmeta Corporation, Jul. 5, 2001; 8 pages.
Pering, et al., "Voltage Scheduling in the IpARM Microprocessor System," Proceedings of the International Symposium on Low Power Electronics and Design, Jul. 26-27, 2000; pp. 96-101.
Curriculum Vitae for Bill Gervasi, available at http://www.discobolusdesigns.com/personal/resume.html, last accessed Aug. 26, 2016; 3 pages.
"Intel Announces New Microarchitecture For Wireless And Internet Infrastructure Applications," Intel Corporation Press Release, Aug. 23, 2000, archived by the Internet Archive at <http://web.archive.org/web/20001208135800/http://www.intel.com/pressroom/archive/releases/em082300.htm>; 3 pages.
"Intel Demonstrates 'Geyserville' Technology—Bringing Near Desktop Performance to Mobile PCs," Intel Corporation Press Release, Feb. 24, 1999, archived by the Internet Archive at <http://web.archive.org/http://developer.intel.com/pressroom/archive/releases/mp022499.htm>; 3 pages.
"Intel Pentium II Processor Mobile Module: Mobile Module Connector 2 (MMC-2)," Intel Corporation, Order No. 243668-002, Aug. 1998; 56 pages.
Intel Xscale Microarchitecture Technical Summary, Intel Corporation, 2000; 14 pages.
Halfhill, T., "Top PC Vendors Adopt Crusoe," Microprocessor Report, Jul. 10, 2000; 6 pages.
Halfhill, T., "Transmeta Breaks x86 Low-Power Barrier," Microprocessor Report, Feb. 14, 2000; 11 pages.
"Mobile Intel Pentium III Processor in BGA2 and Micro-PGA2 Packages," Intel Corporation Data Sheet, Order No. 249562-001, 2001; 84 pages.
English-language Abstract of Japanese Patent Application Publication No. 2000-10673A, published Jan. 14, 2000; 2 pages.
Advanced Configuration and Power Interface Specification, Revision 1.0b, Intel Corporation, Microsoft, and Toshiba, Feb. 2, 1999; 397 pages.

(56) References Cited

OTHER PUBLICATIONS

Hong, et al., "Power Optimization of Variable-Voltage Core-Based Systems," IEEE Transactions on Computer-Aided Design of Integrated Circuits and Systems, vol. 18, No. 12, Dec. 1999; 13 pages.
Advanced Configuration and Power Interface Specification, Revision 2.0, Intel Corporation, Microsoft Corporation, Phoenix Technologies Ltd., Toshiba Corporation, Jul. 27, 2000; 481 pages.
Duarte, et al., "Evaluating Run-Time Techniques for Leakage Power Reduction," VLSI Design/ASPDAC 2002; 30 pages.
Iyer, et al., "Power Efficiency of Voltage Scaling in Multiple Clock, Multiple Voltage Cores," IEEE International Conference on Computer Aided Design, 2002; 8 pages.
Katz, et al., "Dynamic Power Management Optimizes Performance vs. Power in Embedded Applications of Blackfin Processors," Analog Dialogue, vol. 36, No. 4, Jul.-Aug. 2002; 7 pages.
Kim, et al., "Long-Term Power Minimization of Dual-VT CMOS Circuits," IBM Thomas J. Watson Research Center, Jun. 20, 2002; 5 pages.
Advanced Configuration and Power Interface Specification, Revision 2.0c, Compaq Computer Corporation, Intel Corporation, Microsoft Corporation, Phoenix Technologies Ltd., Toshiba Corporation, Aug. 25, 2003; 518 pages.
Hu et al., "Microarchitectural Techniques for Power Gating of Execution Units," Proceedings of the International Symposium on Low Power Electronics and Design, 2004; pp. 32-37.
Advanced Configuration and Power Interface Specification, Revision 3.0, Compaq Computer Corporation, Intel Corporation, Microsoft Corporation, Phoenix Technologies Ltd., Toshiba Corporation, Sep. 2, 2004; 618 pages.
Chapman, M., "The Benefits of Dual-Core Processors in High-Performance Computing," IBM Systems and Technology Group, Jun. 2005; 18 pages.
Semeraro, et al. "Dynamic Frequency and Voltage Control for a Multiple Clock Domain Architecture" Department of Electrical and Computer Engineering and Department of Computer Science University of Rochester, 2002; 12 pages.
Zorian, et al.,"Testing Embedded-Core Based System Chips" IEEE Computer, vol. 32, No. 6, 1999; 9 pages.
Turk, et al., "Eigenfaces for Recognition," Journal of Cognitive Neuroscience. vol. 3, No. 1, 1991; pp. 71-86.
Yuille, et al., "Feature Extraction from Faces Using Deformable Templates," International Journal of Computer Vision, 8:2, 99-111, 1992; pp. 99-111.
Montera, D., "Object Tracking Through Adaptive Correlation," Master's Thesis, School of Engineering of the Air Force Institute of Technology, Dec. 17, 1992; 164 pages.
Maes, et al., "The ALIVE System: Wireless, Full-body Interaction with Autonomous Agents," M.I.T. Media Laboratory Perceptual Computing Technical Report No. 257, Nov. 1995; 17 pages.
Beymer, D., "Pose-Invariant Face Recognition Using Real and Virtual Views", Massachusetts Institute of Technology Artificial Intelligence Laboratory, A.I. Technical Report No. 1574, Mar. 1996; 186 pages.
Jebara, T., "3D Pose Estimation and Normalization for Face Recognition," Bachelor's Thesis, Department of Electrical Engineering, McGill University, May 1996; 138 pages.
Jebara, et al., "Parametrized Structure from Motion for 3D Adaptive Feedback Tracking of Faces," MIT Media Laboratory, Perceptual Computing Technical Report No. 401, Nov. 28, 1996; 8 pages.
Oliver, et al.,"LAFTER: Lips and Face Real Time Tracker," Proceedings of the Computer Vision and Pattern Recognition Conference, 1997; 11 pages.
Raja, et al., "Colour Model Selection and Adaptation in Dynamic Scenes," Proceedings European Conference Computer Vision, 1998; 15 pages.
Haritaoglu, I., "A Real Time System for Detection and Tracking of People and Recognizing Their Activities," European Conference on Computer Vision, Oct. 1998; 35 pages.
Darrell, et al., "Integrated Person Tracking Using Stereo, Color, and Pattern Detection," Conference on Computer Vision and Pattern Recognition, Jun. 23-25, 1998; pp. 601-609.
Gavrilla, et al., "Real-Time Object Detection for 'Smart' Vehicles," Proceedings of the International Conference on Computer Vision, 1999; 7 pages.
Jepson, et al., "Robust Online Appearance Models for Visual Tracking" IEEE Transactions on Pattern Analysis and Machine Intelligence, vol. 25, No. 10, Oct. 2003; 16 pages.
Bolt, R., "'Put-That-There': Voice and Gesture at the Graphics Interface," Architecture Machine Group, Massachusetts Institute of Technology, 1980; 9 pages.
Krueger, et al., "Videoplace—An Artificial Reality," Proceedings of the SIGCHI Conference on Human Factors in Computing Systems, Apr. 1985; pp. 35-40.
Sturman, et al., "A Survey of Glove-based Input," IEEE Computer Graphics and Applications, 1994; 10 pages.
Kjeldsen, F., "Visual Interpretation of Hand Gestures as a Practical Interface Modality," Columbia University, Doctoral Dissertation, 1997; 178 pages.
Hand, C., "A Survey of 3D Interaction Techniques," Computer Graphics Forum, vol. 16, No. 5, 1997; pp. 269-281.
Hammond, et al., "Next Generation Itanium Processor Overview," Intel Developer's Forum, Aug. 27-30, 2001; 27 pages.
Quan, M., "Notebooks try on Crusoe processor at PC Expo," EE Times, Jun. 30, 2000; 3 pages.
Intel® Microprocessor Quick Reference Guide, 1990; 34 pages.
Lewis, P., "Personal Computers; Innovative Portables From Zenith", The New York Times, May 21, 1991; 3 pages.
"Transmeta Breaks the Silence, Unveils Smart Processor to Revolutionize Mobile Internet Computing ," Crusoe, Jan. 19, 2000, archived by the Internet Archive at https://web.archive.org/web/20000817082320/http://www.transmeta.com/press/011900-1.html; 3 pages.
Fried, J., "Notebooks with Transmeta chip arrive in U.S.," CNET News, Oct. 25, 2000, archived by the Internet Archive at http://web.archive.org/web/20011101161522/http://news.cnet.com/news/0-1006-200-3294237.html; 2 pages.
Owens, et al., "Polygon Rendering on a Stream Architecture," 2000 SIGGRAPH Eurographics Workshop on Graphics Hardware, Aug. 2000; 10 pages.
McConnell, R., "Massively Parallel Computing on the Fuzion Chip," PixelFusion PLC, 2000; 23 pages.
"i860 64-Bit Microprocessor Hardware Design Guide," Intel Corporation, Feb. 1989; 219 pages.
Ellsworth, D., "Polygon Rendering for Interactive Visualization on Multicomputers," the University of North Carolina at Chapel Hill, Doctoral Dissertation, 1996; 236 pages.
Stokes, J., "Introduction to Multithreading, Superthreading and Hyperthreading," Ars Technica, Oct. 3, 2002; 10 pages.
Segal, et al., "The OpenGL Graphics System: A Specification, Version 1.4," Silicon Graphics, Inc., Jul. 24, 2002; 312 pages.
Boleyn, et al., "A Split Data Cache for Superscalar Processors", Proceedings of the IEEE International Conference on Computer Design: VLSI in Computers & Processors, Oct. 1993; 8 pages.
Lenoski, et. al., "The DASH Prototype: Implementation and Performance," ACM, 1992; pp. 418-429.
"PERMEDIA Testimonials Oct. 1995", Oct. 1995, available at http://www.thefreelibrary.com/PERMEDIA+ Testimonials+Oct+95.-a017424284; 5 pages.
Saavedra, et al., "Measuring Cache and TLB Performance and Their Effect on Benchmark Run Times," IEEE Transactions on Computers, vol. 44. No. 10, Oct. 1995; pp. 1223-1235.
"SL-11 USB Controller Technical Reference," Scanlogic Corporation (now Cypress Semiconductor Corporation), Dec. 1996; 56 pages.
"SL11-R-USB RISC Processor Product Information, Revision 1.0," ScanLogic Corporation (now Cypress Semiconductor Corporation), Aug. 1997; 2 pages.
"USBN9602 (Universal Serial Bus) Full Speed Function Controller with DMA Support," National Semiconductor Corporation (now Texas Instruments), Nov. 1998; 47 pages.

(56) References Cited

OTHER PUBLICATIONS

"ST72671 Product Preview," SGS—Thomson Microelectronics (now STMicroelectronics), Rev. 1.1. Mar. 1998: 101 pages.
"USBFC (USB Function Controller) EIFUFAL501 User's Manual," Rev. 2.0, Seiko Epson Corporation, Mar. 24, 1998; 35 pages.
"PowerPC MPC823 Users Manual, The Microprocessor for Mobile Computing," Motorola, Inc. (now Freescale Semiconductor, Inc.), Apr. 1998; 1357 pages.
"Universal Serial Bus Specification", Revision 1.0, Compaq Computer Corporation, Digital Equipment Corporation, IBM PC Company, Intel Corporation, Microsoft Corporation, NEC, Northern Telecom, Jan. 15, 1996; 268 pages.
"Am186TMED/EDLV High Performance, 80C186- and 80C188-Compatible, 16-Bit Embedded Microcontrollers," Advanced Micro Devices, Inc., May 1997; 88 pages.
"SL11RUSB Hardware Specification Technical Reference," Revision 1.20, Scanlogic Corporation, Jul. 14, 1998; 47 pages.
"USB Products Keep Rollin," EDN Network Magazine, Nov. 7, 1996; 2 pages.
"USB97C100 Advance Information, Multi-Endpoint USB Peripheral Controller," Standard Microsystems Corporation, Feb. 11, 1998; 80 pages.
"USBFC (USB Function Controller) EIFUFAL501 User's Manual," Revision 2.0, Seiko Epson Corporation, Mar. 24, 1998; 35 pages.
Freeman, et al., "Television Control by Hand Gestures," Mitsubishi Electric Research Laboratories, Dec. 1994; 7 pages.
"Hardware Maintenance Service for Service Level I, Machine Types 2144 and 2168 and IBM Monitors," IBM Corporation, Dec. 1995; 246 pages.
"IBM Aptiva" Wikipedia, available at http://en.wikipedia.org/wiki/IBM_Aptiva, accessed Sep. 24, 2014; 3 pages.
Dalal, et al., "48-bit Absolute Internet and Ethernet Host Numbers," Xerox Corporation, Jul. 1981; 18 pages.
"RFC: 793, Transmission Control Protocol, Darpa Internet Program Protocol Specification," Information Sciences Institute University of Southern California, Sep. 1981; 90 pages.
Saltzer, J., "Request for Comments: 1498, On the Naming and Binding of Network Destinations," Network Working Group, Aug. 1993: 10 pages.
Podgorny, et al., "Video On Demand Technologies and Demonstrations," Air Force Research Laboratory Information Directorate, May 1998; 393 pages.
Murhammer, et al., "TCP/IP Tutorial and Technical Overview," IBM, Oct. 1998; 738 pages.
Cortes, et al., "The SICMA Teleteaching Trial on ADSL and Intranet Networks," 4th European Conference on Multimedia Applications, Services, and Techniques. 1999; 14 pages.
"RealPlayer 5.0, Release Notes," RealNetworks Inc., 1996, available at http://service.real.com/help/player/free5.0/notes.htm; 7 pages.
"NetShow," Wikipedia, available at http://en.wikipedia.org/wiki/NetShow, accessed Sep. 24, 2014; 2 pages.
"History," TiVo, archived on Aug. 7, 2013 by the Internet Archive at http://www3.tivo.com/jobs/questions/history-of-tivo/index.html; 2 pages.
"Philips HDR110", Tivopedia.com, archived on Feb. 28, 2014 by the Internet Archive at https://web.archive.org/web/20140228205013/http://www.tivopedia.com/model-philips-hdr110.php; 3 pages.
Mutoh, et al., "1-V Power Supply High-Speed Digital Circuit Technology with Multithreshold—Voltage CMOS," IEEE Journal of Solid-State Circuits, vol. 30, No. 8, Aug. 1995; 8 pages.
Lackey, et al., "Managing Power and Performance for System-on-Chip Designs using Voltage Islands" ("Lackey"), IBM Microelectronics Division, IEEE/ACM International Conference, 2002; 8 pages.
Semeraro, et al., "Energy-Efficient Processor Design Using Multiple Clock Domains with Dynamic Voltage and Frequency Scaling," High Performance Computer Architecture, 2002; 12 pages.
Lefurgy, et al., "Energy Management for Commercial Servers", vol. 36, Issue 12, IBM Austin Research Lab, 2003; 10 pages.
Wu, et al., "Voltage and Frequency Control with Adaptive Reaction Time in Multiple-Clock-Domain Processors," IEEE Computer Society, Feb. 2005; 12 pages.
Gruian, F., "System-Level Design Methods for Low-Energy Architectures Containing Variable Voltage Processors," Department of Computer Science, Lund University, 2001; 7 pages.
Rosenfeld, et al. "Coarse-Fine Template Matching", vol. 7, No. 2, IEEE Systems, Feb. 1977; 4 pages.
Lee, et al. "An Intelligent Real-Time Multiple Moving Object Tracker" ("Lee 1988"), SPIE vol. 937, Applications of Artificial Intelligence VI, 1988; 8 pages.
Yuille A., "Deformable Templates for Face Recognition," Massachusetts Institute of Technology, Journal of Cognitive Neuroscience, vol. 3, No. 1, 1991; 12 pages.
Harvey, A., et al., "Software Speedup Techniques for Binary Image Object Recognition," vol. 3, IEEE, 1991; 5 pages.
Rauterberg, et al., "A gesture based interaction technique for a planning tool for construction and design," IEEE International Workshop on Robot and Human Communication, 1997; 6 pages.
Kjeldsen, et al., "Interaction with On-Screen Objects using Visual Gesture Recognition," IEEE Computer Society, Jun. 1997; 6 pages.
Crockett, et al., "Parallel Polygon Rendering for Message-Passing Architectures," vol. 2, No. 2, IEEE Parallel & Distributed Technology, 1994; 12 pages.
Araki, et al., "Video DSP Architecture for MPEG 2 Codec," Proceedings of 1994 IEEE International Conference on Acoustics, Speech, and Signal Processing, vol. 2, Apr. 1994; 4 pages.
Wirthlin, et al., "The Nano Processor: a Low Resource Reconfigurable Processor," 1994; 8 pages.
Wazlowski, M., "A Reconfigurable Architecture Superscalar Coprocessor", Brown University, 1992; 128 pages.
Crockett, et al., "A MIMD Rendering Algorithm for Distributed Memory Architectures," IEEE, Oct. 1993; 8 pages.
Whitman, S., "A Task Adaptive Parallel Graphics Renderer," IEEE Oct. 1993: 8 pages.
Smith, A., "Cache Memory Design: An Evolving Art," IEEE Spectrum, vol. 24, No. 12, Dec. 1987; 6 pages.
"SL-11 USB Controller Technical Reference, Revision 1.11," ScanLogic Corporation (now Cypress Semiconductor Corporation), Jan. 1997; 57 pages.
USS-620 USB Device Controller with DMA Bridge Advance Data Sheet, Revision 4, Lucent Technologies (now Alcaltel-Lucent), Oct. 1997; 1 page.
USB97C100 Advance Information, Feb. 11. 1998, Standard Microsystems Corporation (now Microchip Technology Inc.); 54 pages.
"8237/8237-2 High Performance Programmable DMA Controller," Component Data Catalog, Intel Corporation, Jan. 1981; 23 pages.
"SN54153, SN54LS153, SN54S153 SN74153, SN74LS153, SN74S153 Dual 4-Line to 1-Line Data Selectors/Multiplexers," Texas Instruments, Mar. 1988; 4 pages.
"Standard Microsystems Corporation Reports Net Income from Continuing Operations for the Third Quarter of Fiscal 1998," Business Wire, Dec. 16, 1997; 5 pages.
Fredlund, et al., "Film-to-Video Imaging; Concepts and Applications," Consumer Electronics 1990, IEEE 1990 International Conference, Jun. 1990; 8 pages.
Kinghorn, J.R., "Enhanced On-Screen Displays for Simpler TV Control," IEEE Transactions on Consumer Electronics, vol. 38, No. 3, Aug. 1992; 9 pages.
Miller, E., "Standardization of Set Top Box Design for Interactive Television," Consumer Electronics 1994, Jun. 1994; 2 pages.
Lee, et al., "Point & Pick User Interface for Projection Television," Consumer Electronics 1995, Jun. 1995; 2 pages.
Perry, T., "The Trials and Travails of Interactive TV,", IEEE Spectrum, vol. 33, No. 4, Apr. 1996; 7 pages.
Usui, et al., "Multimedia Services in the HDTV Muse System", IEEE Transactions and Broadcasting, vol. 42, No. 3, Sep. 1996; 6 pages.
Sakamoto, el al., "An MPEG-1 & 2 Decoder and GUI System for a Multimedia Home Terminal (STB)," Consumer Electronics 1996, Jun. 1996; 2 pages.
"Press Kit", Frox Inc.

(56) References Cited

OTHER PUBLICATIONS

Kalva, et al., "Implementing Multiplexing, Streaming and Server Interaction for MPEG-4," IEEE Transactions on Curcuits and Systems for Video Technology, vol. 9, No. 8, Dec. 1999; 14 pages.
Lahan, et al., "Broadband Network Set-Top Box System," Tampere University of Technology, Oct. 25, 2000; 7 pages.
England, N., "Graphics System Architecture for Interactive Application-Specific Display Functions," 1986.
England, N., "Graphics-Intensive Applications Get a Boost, Application Acceleration: Development of the TAAC-1," 1988.
Owens, J., "Computer Graphics on a Steam Architecture," Stanford University, Doctoral Dissertation, Nov. 2002; 178 pages.
Boyd, C., "Chapter 5: DirectX," SIGGRAPH 2002; 50 pages.
Olano, M., "SGI OpenGL Shader," Level-of-Detail White Paper, SIGGRAPH 2002; 22 pages.
Weber, el al., "Exploring the Benefits of Multiple Hardware Contexts in a Multiprocessor Architecture: Preliminary Results," Proceedings of the 16th Annual International Symposium on Computer Architecture, Jun. 1989; 8 pages.
Rost, R., "Course 17: State-of-the-Art in Hardware Rendering, The OpenGL Shading Language," SIGGRAPH 2002.
Rost, R., "Course 17: State-of-the-Art in Hardware Rendering, Chapter 6: The OpenGL Shading Language," SIGGRAPH 2002 Course Notes, Aug. 5, 2002; 56 pages.
"Microsoft DirectX 8.1 (C++) Programmers Guide," Microsoft Corporation, Jun. 17, 2002; 406 pages.
Hirata, et al., "An Elementary Processor Architecture with Simultaneous Instruction Issuing from Multiple Threads," Proceedings of the 19th Annual Symposium on Computer Architecture, May 1992; 10 pages.
McCool, M. "SMASH: A Next-Generation API for Programmable Graphics Accelerators," University of Waterloo, Technical Report CS-2000-14, Apr. 20, 2001; 31 pages.
i860 Microprocessor Family Programmer's Reference Manual, 1991.
Bajaj, et al., "Parallel Multi-PC Volume Rendering System," University of Texas at Austin, 2002; 6 pages.
McConnell, R., "Massively Parallel Computing on the Fuzion Chip," PixelFusion plc, Presentation slides, Aug. 25, 1999; 24 pages.
Meissner, et al., "Parallel volume rendering on a single-chip SIMD architecture," Proceedings of the IEEE 2001 Symposium on Parallel and Large-Data Visualization and Graphics; 8 pages.
Rixner, et al., "A Bandwidth-Efficient Architecture for Media Processing," Proceedings of the 31st Annual ACM/IEEE International Symposium on Microarchitecture, 1998; 11 pages.
Rixner, R., "Stream Processor Architecture," Rice University, Aug. 1, 2001; 134 pages.
Kapasi, et al., "Stream Scheduling," Stanford University Concurrent VLSI Architecture Memo 122, Proceedings of the 3rd Workshop on Media and Stream Processors, Dec. 2, 2001; 11 pages.
Khailany, et al., "Imagine: Media Processing with Streams," IEEE Micro, Mar.-Apr. 2001; 12 pages.
Rixner, S., "A Bandwidth-efficient Architecture for a streaming Media Processor," Massachusetts Institute of Technology, Doctoral Dissertation, Apr. 24, 2001; 146 pages.
Mattson, P., "A programming System for the Imagine Media Processor," Stanford University, Doctoral Dissertation, Mar. 2002; 210 pages.
Tullsen, et al., "Simultaneous Multithreading: Maximizing On-Chip Parallelism," Proceedings of the 22nd Annual International Symposium on Computer Architecture, Jun. 1995; 12 pages.
Ungerer, et al., "Multithreaded Processors," The Computer Journal, vol. 45, No. 3, 2002; 29 pages.
Eggers, et al., "Simultaneous Multithreading: A Platform for Next-Generation Processors," WRL Technical Note TN-52, Digital Western Research Laboratory; 26 pages.
Patel, et al., "Architectural Features of the i860™—Microprocessor RISC Core and On-Chip Caches," Proceedings of the IEEE International conference on Computer Design: VLSI in Computers and Processors, Oct. 2-4, 1989; 6 pages.
Kohn, et al., "Introducing the Intel i860 64-Bit Microprocessor," IEEE Micro, vol. 9, Issue 4, Jul. 1989; pp. 15-30.
Grimes, et al., "The Intel i860 64-Bit Processor: A General-Purpose CPU with 3D Graphics Capabilities," IEEE Computer Graphics and Applications, vol. 9, Issue 4, Jul. 1989; pp. 85-94.
Definition of "live", Merriam-Webster's Online Dictionary, available at http://www.merriam-webster.com/dictionary/live; 3 pages.
English-language Abstract of Chinese Patent Application Publication No. 1154629 A, published Jul. 16, 1997; 1 page.
English-language Abstract of European Patent Application Publication No. 0762769 A1, published Mar. 12, 1997; 1 page.
English-language Abstract of Japanese Patent Application Publication No. 05-252439, published Sep. 28, 1993; 2 pages.
English-language Abstract of Japanese Patent Application Publication No. 06-153017, published May 31, 1994; 2 pages.
English-language Abstract of Japanese Patent Application Publication No. 06-217271, published Aug. 5, 1994; 2 pages.
English-language Abstract of Japanese Patent Application Publication No. 07-154626, published Jun. 16, 1995; 2 pages.
English-language Abstract of Japanese Patent Application Publication No. 07-222027, published Aug. 18, 1995; 2 pages.
English-language Abstract of Japanese Patent Application Publication No. 07-281666, published Oct. 27, 1995; 2 pages.
English-language Abstract of Japanese Patent Application Publication No. 08-106421, published Apr. 23, 1996; 2 pages.
English-language Abstract of Japanese Patent Application Publication No. 08-331415, published Dec. 13, 1996; 2 pages.
English-language Abstract of Japanese Patent Application Publication No. 09-006947, published Jan. 10, 1997; 2 pages.
English-language Abstract of Korean Patent Application Publication No. 100185947, published Dec. 28, 1998; 2 pages.
English-language Abstract of Korean Patent Application Publication No. 100191731, published Jan. 26, 1999; 2 pages.

* cited by examiner

PERFORMANCE AND POWER OPTIMIZATION VIA BLOCK ORIENTED PERFORMANCE MEASUREMENT AND CONTROL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is a continuation of U.S. patent application Ser. No. 15/217,553, titled "Performance and Power Optimization via Block Oriented Performance Measurement and Control," filed Jul. 22, 2016, and issued as U.S. Pat. No. RE47,420, which is a reissue of U.S. patent application Ser. No. 09/798,176, titled "Performance and Power Optimization via Block Oriented Performance Measurement and Control," filed Mar. 2, 2001, and issued as U.S. Pat. No. 6,895,520, all of which are incorporated by reference herein in their entireties. This application is a re-issue of U.S. patent application Ser. No. 09/798,176, titled "Performance and Power Optimization via Block Oriented Performance Measurement and Control," filed Mar. 2, 2001, and issued as U.S. Pat. No. 6,895,520, which is incorporated by reference herein in its entirety.*

BACKGROUND OF THE INVENTION

I. Field of the Invention

This invention relates to integrated circuits and more particularly to power management in integrated circuits.

2. Description of the Related Art

Large computational devices, e.g., current microprocessors, include many functional units such as one or more fixed point units, load/store units, floating point units (FPU), vector arithmetic units, barrel shifters, instruction and data cache memories, bridge or tunnel circuits, memory controllers, first in first out (FIFO) buffers, and various input/output interface units (e.g., interfaces for universal asynchronous receiver/transmitters (UART), serializer/deserializer (SERDES), HyperTransport™, Infiniband™, PCI bus). In a portable computing environment, where power conservation is particularly important, power management techniques have been implemented to conserve power based on when, e.g., a period of inactivity occurs. The power conservation typically includes stopping clocks for a period of time. However, the clocks are controlled globally, and thus in situations where one part of a processor is being heavily used but another part is being lightly utilized, all the functional blocks in the processor are configured for heavy use. Thus, power may be wasted in situations where, e.g., the fixed point unit is being used but the floating point unit is not being utilized heavily or at all.

In a prior art power savings approach, disclosed in U.S. Pat. No. Re 37,839, functional blocks are deactivated to save power. The activation and deactivation of the functional blocks is controlled by the flow of data within the integrated circuit. Thus, as data flows through the integrated circuit, those functional blocks are turned on and off as necessary to accommodate that data flow.

The amount of power consumed by a functional block is directly related to its performance. In order to allocate power resources more effectively, it would be desirable to be able to dynamically match performance and thus control power consumed by individual functional blocks according to the utilization requirements of the functional blocks. However, current designs generally do not provide information about utilization of the individual functional blocks, and power consumption is not tuned to match the loading of the individual functional blocks. A possible disadvantage to turning clocks on and off based on data flow is that inefficiencies may result due to the time it takes to turn clocks on and off to the various functional blocks. Accordingly, it would be desirable to dynamically adjust the power consumed by functional blocks of an integrated circuit according to the utilization or loading of those functional blocks and thus achieve power savings while maintaining performance.

SUMMARY OF THE INVENTION

The present invention monitors the utilization of the functional blocks in an integrated circuit. Based on that information, the power consumption and thus the performance levels of the functional blocks can be tuned. When a functional block is heavily loaded by an application, the performance level and power consumption of that particular functional block can be increased. At the same time, other blocks that may not be loaded by that application and have lower performance requirements can be kept at a relatively low power consumption level. Thus, power consumption can be reduced overall without unduly impacting performance.

In one embodiment, the invention provides a method for controlling power consumption in an integrated circuit that includes a plurality of functional blocks. The functional blocks generate block utilization information. The power consumption of the respective functional blocks is managed according to respective block utilization information. The power consumption can be managed by adjusting dispatch rate of operations through the particular functional block, adjusting the clock frequency of clocks being supplied to the functional circuit and/or adjusting the voltage along with the clock frequency. In an embodiment, utilization information may be kept on a task basis.

In another embodiment, the invention provides a computer system that includes an integrated circuit that has a plurality of functional blocks. Utilization circuits that are respectively associated with the functional blocks provide block utilization information of the functional blocks. A computer program includes an instruction sequence executable by the integrated circuit to adjust power consumption levels of the functional blocks according to the block utilization information.

In another embodiment an integrated circuit includes a plurality of functional blocks. Utilization circuits respectively associated with the functional blocks provide block utilization information of the functional blocks. The integrated circuit is responsive to the block utilization information to independently adjust power consumption levels of the functional blocks.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
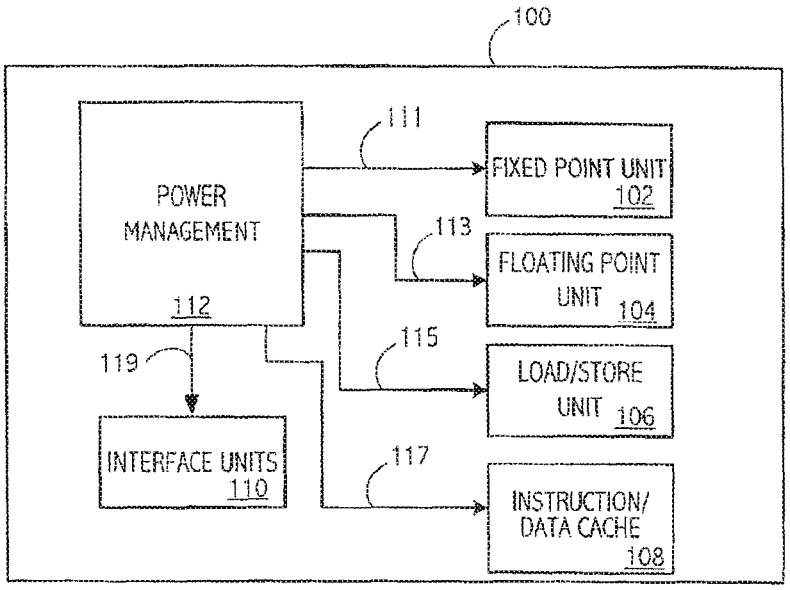
FIG. 1 shows a block diagram of an exemplary integrated circuit incorporating the present invention.

Referring to FIG. 1, a block diagram of an exemplary integrated circuit incorporating an embodiment of the present invention is illustrated. Exemplary processor 100 includes fixed point unit (ALU) 102, a floating point unit (FPLU) 104, a load/store unit 106, instruction/data cache 108, input/output units 110 and a power management unit 112. In one embodiment, power management unit 112 supplies clock signals 111, 113, 115, 117, and 119 to the individual functional blocks. In an embodiment, power management, unit 112 adjusts the frequency of the clocks according to the utilization of the functional units. The functional units shown in FIG. 1 are general in nature. Other functional units may be included in addition to or in place of those illustrated.

Figure 2:
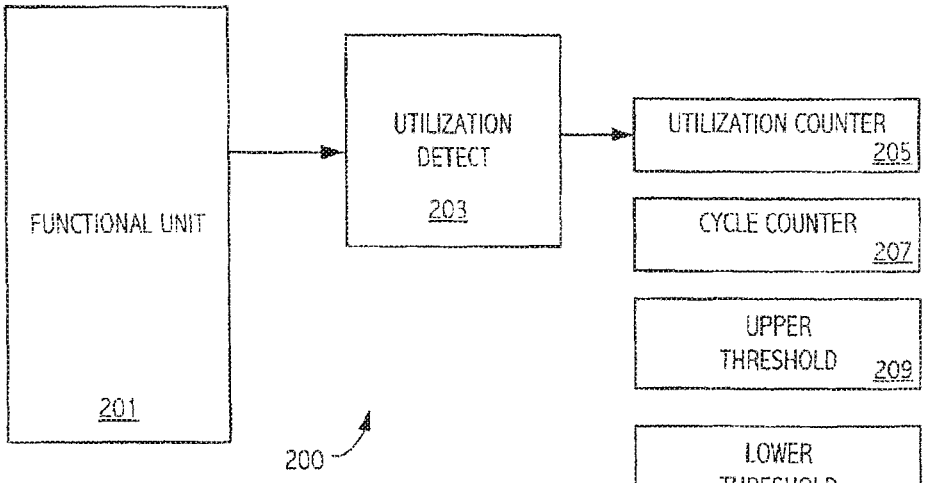
FIG. 2 illustrates a representative functional block and associated detection and counting registers.

An exemplary functional block 200 is shown in FIG. 2. The "function" provided by the functional block 200 shown in FIG. 2 can vary. For example, the functional block 200 may be a floating point unit or a cache memory. Functional block 200 includes the functional unit 201 that performs the "function." Functional unit 100 also includes a utilization detect circuit 203. The functional block 200 generates information indicating the utilization of the block. That information may be a percentage of time that the block is used or conversely, the percentage of time the block is idle. The utilization information can be generated in a number of ways. For example, the utilization of a cache memory may be determined according to the number of cache accesses that occur over a predetermined period of time. Alternately, the cache access utilization may be determined by the percentage of memory accesses that are directed to the cache. In another example, floating point (FPU) utilization may be determined by detecting when the FPU is requested to perform a floating point operation. The number of FPU requests may be counted over a period of time to determine utilization. For an execution unit of a processor, the measured value used to determine utilization may be the number of instructions that are dispatched over a period of time.

Thus, as shown in FIG. 2, a utilization detection circuit 203 is provided that detects when the functional unit is being utilized in the manner described above according to the type of functional unit and the particular information desired. Assume that the utilization detection circuit 203 detects a utilization event, e.g., when an FPU receives a request to perform a floating point operation. That detection causes a utilization counter 205 to increment a count value to indicate that a utilization occurred. The size of the utilization counter depends upon how often the system checks utilization of the functional block, e.g., every 10 microseconds, as well as the number of utilization events that counter 205 is expected to count. The longer the period between checking of block utilization, and/or the more events to be counted, the bigger the counter size required.

In addition to counting the utilization events, a measure may be needed to indicate the period of time over which the counted utilizations occurred. In the exemplary embodiment shown in FIG. 2, cycle counter 207 counts the number of cycles that occurs to provide that information. Cycle counter 207 may be a global counter or a counter local to the functional block. Note that cycle counter 207 may count more slowly than the actual clock rate. For example, cycle counter 207 may count at 100 MHz when the rated processor speed is one GHz. It is sufficient that cycle counter 207 provide an indication of a time period over which utilization counter 205 can be evaluated.

Software, which may reside in the operating system or elsewhere in the electronic system can periodically read utilization counter 205 and cycle counter 207 and determine whether the power consumption and thus the performance of the functional unit matches the load of the functional unit, i.e., its utilization. The power consumption of a functional unit can be adjusted in a number of ways including increasing or decreasing a dispatch rate of instructions into an execution unit (or floating point operations into an FPU), adjusting clock frequency up or down as well as adjusting voltage up or down to match the clock rate. If the functional unit is set for low performance operations and thus has a low power consumption setting and the latest utilization information indicates that the functional unit is heavily loaded, the power consumption and thus performance of the functional unit can be increased to match the performance requirements indicated by the utilization information. In order to increase performance, clock frequency, voltage, and dispatch rate can all be increased. Note that voltage is typically changed only with clock frequency.

If on the other hand, the utilization information indicates that the functional unit is lightly loaded, the clock frequency and/or other power management parameters can be decreased to match the loading. If a particular functional unit is unused or very lightly used, its clocks may even be turned off for a period of time.

In an embodiment, thresholds are provided to determine whether a current power consumption and performance level is appropriate. In order to determine whether current performance levels are adequate as indicated by the utilization information in counter 205, the utilization level can be checked periodically at a predetermined time interval determined by counter 207. Thus, a timer may be provided for each functional unit that indicates how often the utilization counter should be read and the power usage adjusted according to loading factors. When the timer expires, appropriate power management software is notified. The timers could be set differently for different functional units so that each functional unit can be checked at a different time. Alternatively, the operating system or other power management software can read all of the utilization information periodically, with the period being determined by a single timer for all of the functional units.

Alternatively, the value in the utilization counter can be divided by the cycle counter to obtain a utilization per unit time. If that is done, then the utilization counter has to be read before the utilization counter 205 overflows. In either case, the utilization level is compared to upper threshold level 209. If the utilization level is above the upper threshold level 209, clock frequency and/or other performance parameters are increased to provide increased performance. The amount of that increase may be based upon the magnitude of the difference between the calculated utilization level and the upper threshold level. For example, a 10% difference may result in a 10% increase. Alternatively, the increase may occur in fixed steps, e.g., from ¼ of a base clock to ½ of a base clock frequency regardless of the difference between the calculated utilization level and the upper threshold level.

The utilization level may also be compared to the lower threshold value and if the calculated utilization is below the lower threshold level, the clock speed is adjusted downward. Again, the adjustment may be based on the magnitude of the difference between the calculated utilization value and the lower threshold value. Or the adjustment may be fixed between a current level and a next lower level, e.g., from full clock speed in the functional unit to ¾ clock speed. In addition, voltage can be adjusted up or down to match the clock speed for additional power savings.

The threshold registers can be implemented as registers in the functional units or integrated circuit (e.g., model specific registers), system memory, or any other suitable memory that can be used by the software performing the power management function. The values for the threshold registers may be supplied by BIOS, application software or some other initialization source. For example, the values for the threshold registers for each functional block may be calculated empirically by the operating system. Each functional unit would typically have associated with it unique threshold registers.

Figure 3:
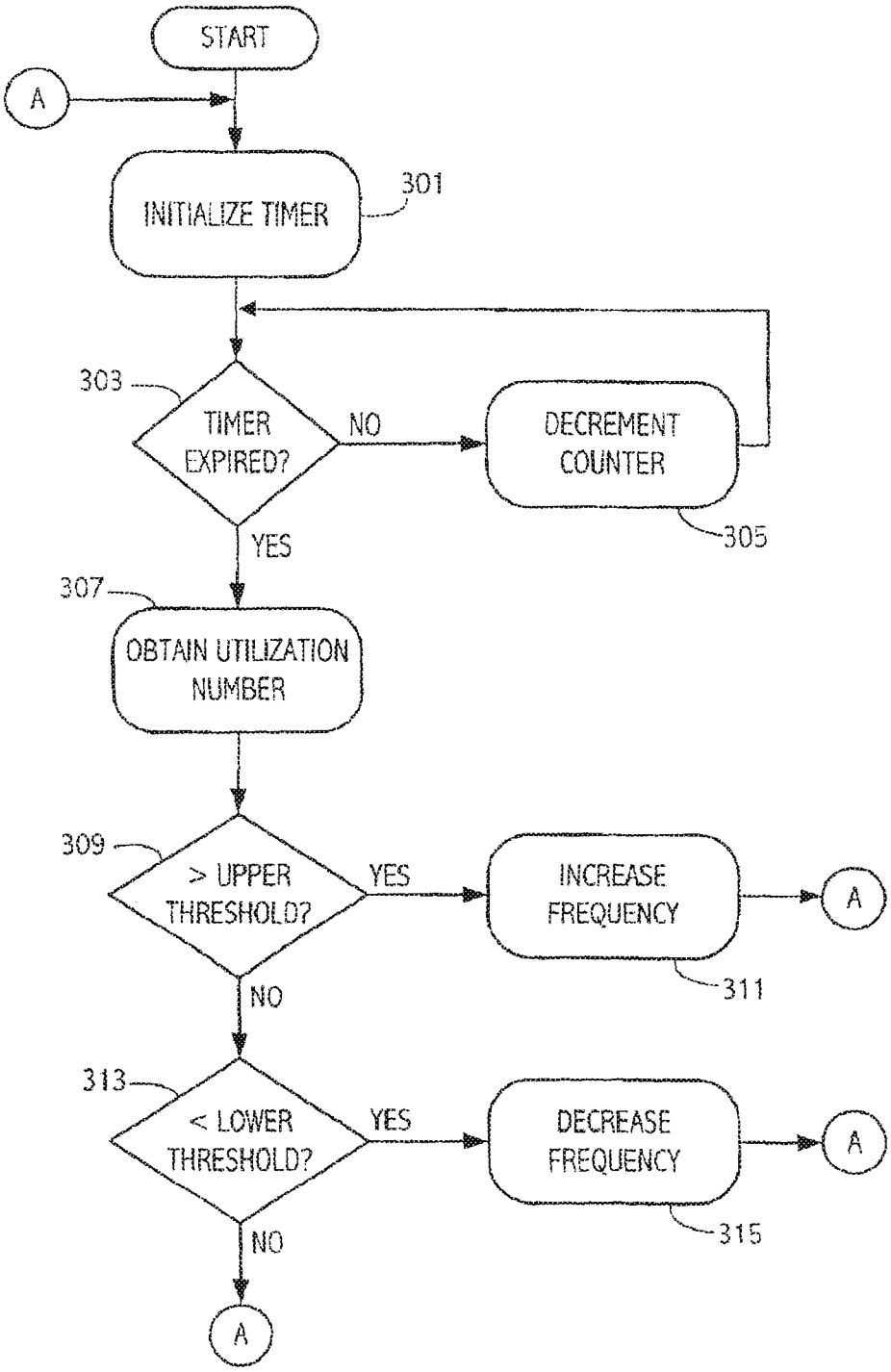
FIG. 3 illustrates a flow diagram of operation of an embodiment of the present invention utilizing threshold values to determine when to adjust the power consumption of a functional block.

FIG. 3 illustrates a flow diagram of operation of an exemplary embodiment utilizing thresholds. The embodiment shown in FIG. 3 could be implemented entirely in hardware, software or a combination, according to the needs of the particular system. On power up, a timer is initialized in 301. The initialization routine may, e.g., load a down counter with a predetermined value. In 303 a comparison is made to see if the counter is expired. If not, the counter is decremented in 305 and the loop continues until the timer has counted down to zero. Once that occurs, a utilization number is obtained in 307. The timer assures that the utilization counter has not overflowed. In other embodiments as described further herein, the utilization counter may be implemented to provide a probability (a rolling average) of the utilization event, and thus there is no risk of utilization counter overflow.

Once an appropriate utilization number is obtained, it is compared to the upper threshold value in 309. If the utilization number is greater than the upper threshold value then in 311, a control indication is provided to power management control logic 112 (see FIG. 1) to increase the clock frequency (and/or other power management parameters as appropriate) of the functional unit. Those parameters can be adjusted by software writing to a clock control register to control the clock frequency being supplied to the functional unit in a manner known in the art, e.g., by selecting a different frequency or specifying a different multiplication value. Writing to a voltage control register can be used to select a different supplied voltage or cause a different voltage to be supplied externally by a voltage regulator. In 313, the utilization number is compared to the lower threshold value and if it is lower, then in 315 a control indication is provided to power management control logic 112 (see FIG. 1) to decrease the clock frequency (and/or other power management parameters as appropriate) of the functional unit. After determining whether or not to adjust power management parameters, the timer is then reinitialized in 301 and the cycle starts over. Note that in one implementation of the flow diagram illustrated in FIG. 3, hardware can be used to alert power management software only when the utilization information is above or below the upper or lower threshold, respectively. Note also that the comparison steps illustrated in comparisons 309 and 311, while shown executing sequentially, may be implemented to execute in parallel.

Figure 4:
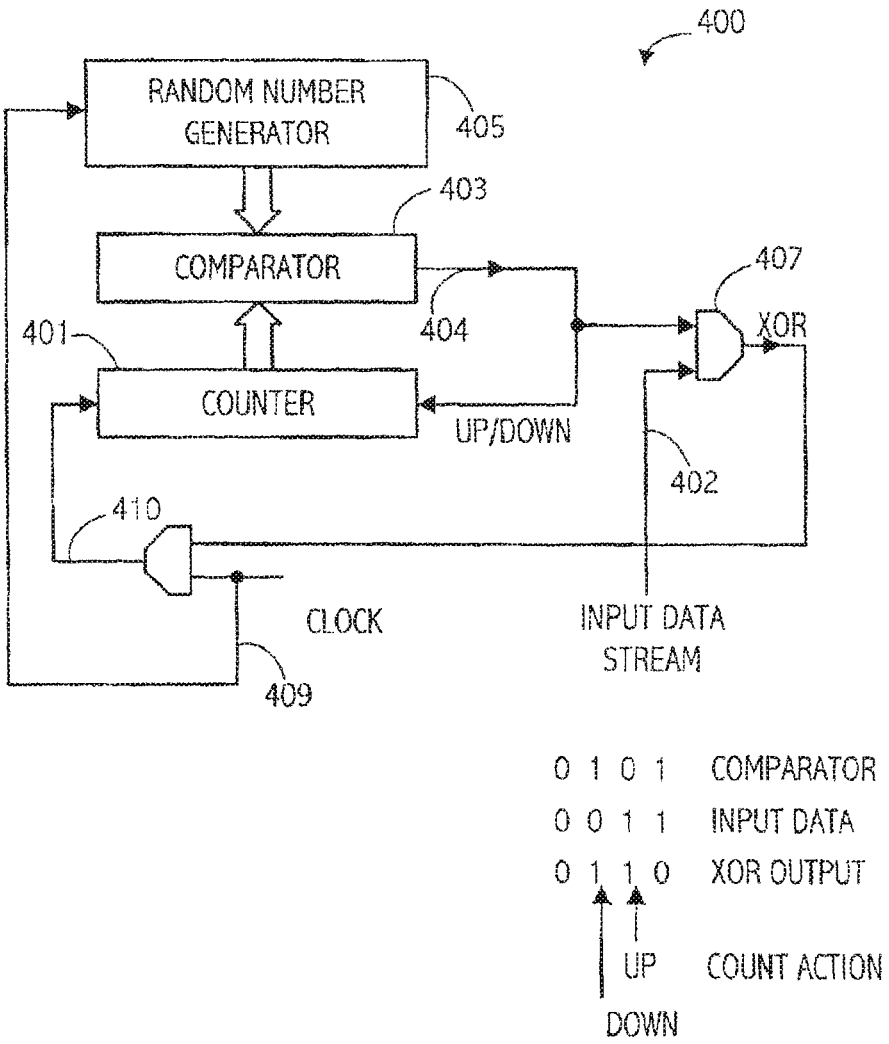
FIG. 4 illustrates a detection circuit that can be utilized to provide a statistical utilization value that provides a rolling average of prior utilizations.

In one embodiment, a non intrusive performance monitoring circuit can be utilized to determine a probability of a utilization event occurring. Such a circuit is shown in FIG. 4 and described in detail in application Ser. No. 09/872,830, entitled "Non-Intrusive Performance Monitoring", filed May 5, 1998, naming Daniel Mann as inventor, which application is incorporated herein by reference in its entirety. One advantage of the non intrusive performance monitoring circuit shown in FIG. 4, is that it provides a mechanism for detecting utilization events without the risk of counter overflow.

FIG. 4 shows one embodiment of an adaptive adder circuit used as a performance monitoring circuit used to integrate the probability stream and determine the relevant probability of a cache hit or other performance parameter occurring. Consider for example, that at each memory access an on-chip cache may successfully provide the required data or may not. The cache utilization, i.e. the hit and miss data is determined by utilization detect circuit 203 (see FIG. 2) and provided as a simple 1 or 0 bit stream to performance monitoring circuit 400 on node 402. Assume a "1" indicates a hit occurring.

A counter 401 provides a count value which is compared in comparator 403 with a random number generated in random number generator circuit 405. If the counter value is greater than or equal to the random number, a 1 is generated. The compare signal 404 output from the comparator is provided back to counter 401 as an up/down count signal. When the comparator indicates that the count is larger than the random number, the compare signal 404 configures the counter 401 as a down counter and when the count is less than the random number, the compare signal 404 configures counter to be an up counter.

The compare signal 404 is compared with the input data stream of interest conveyed on node 402. The input data stream is serially provided samples of the performance parameter being measured (e.g., the cache hit information) which are provided by utilization detect circuit 203. These two stochastic data streams (compare signal and input data stream) are compared to see which one has the highest probability of being 1. That is accomplished by XORing the two data streams together in XOR gate 407. When the data streams differ, there is a difference in probability. That probability information is fed back to increase or decrease the counter value according to the comparator output. The feedback in the illustrated embodiment is accomplished by ANDing together clock signal 409 and the output from XOR gate 407 to provide a gated clock signal 410 to the counter. Consequently, with each new comparison the counter is adjusted to produce a probability stream (from the comparator) which matches the input data stream.

TABLE 1 illustrates the action of the counter:

| | | | | |
|---|---|---|---|---|
| comparator | 0 | 1 | 0 | 1 |
| performance parameter data | 0 | 0 | 1 | 1 |
| XOR output | 0 | 1 | 1 | 0 |
| count action | none | down | up | none |

The adaptive adder circuit effectively integrates the probability stream. The probability stream of the parameter being measured is converted into a digital value which is held in the counter. The counter value represents the probability of the parameter which is being measured. Thus, software or hardware can read counter 401 periodically to determine a sliding window average of the parameter of interest. The size of the window can be adjusted to more closely or less closely track changes in utilization of the functional block.

In addition to monitoring block utilization on an overall basis, the operating system (or other power management software) can monitor block utilization on a software task basis. Thus, the operating system can compile utilization information of various functional blocks per task. In such an embodiment the operating system software creates a power management profile that matches a desired performance level for each functional block for a plurality of tasks. The performance level is indicated by desired power consumption parameters (e.g., clock rate, voltage, dispatch rate) for each of the functional blocks. When the operating system switches the processor to executing a task, the power management controller in conjunction with the operating system software sets the appropriate power management parameters to correspond to the particular task. The power management parameters of the functional blocks can be further adjusted during task execution to further improve power management. In addition, rather than operating system software performing task-based power management, application software may instead perform that function.

Selecting a clock frequency for the various functional units can be accomplished by selectively providing to each functional unit that clock selected by a power management controller. For example, the clocks provided to each functional unit may be a full speed clock, a half speed clock and a quarter speed clock. The granularity of the available clock speed will be design dependent. The ability to provide clocks of different speeds, e.g., by dividing down the full speed clock, is well known in the art and not described further herein.

As is also known in the art, it is advantageous from a power savings perspective to reduce voltage when possible because the power saved is proportional to the square of the voltage reduction, whereas the power savings is linear with respect to frequency reduction. In one embodiment, a plurality of voltages are supplied to the integrated circuit, e.g., one for each potential clock speed for the functional units. A suitable voltage is selected that corresponds to the clock speed. In order to avoid the possible unpredictable results, the voltage should not be adjusted downward until the clock speed has been reduced, and the clock speed should not be adjusted upward until the voltage has been increased. In other embodiments the correct voltage for a particular functional block may be a selectable off chip.

It is desirable to reduce any performance impact when adjusting power management parameters in an attempt save power. Thus, it is desirable that the granularity of checking utilization information be sufficiently high that performance degradation, particularly any degradation noticeable to a user, is minimized. From a user's perspective, checking block utilization every ten milliseconds may be sufficient for most tasks. However, given high clock speeds in current integrated circuits, more frequent checking may be desirable, particularly where performance is very important.

There are various other approaches to conserve power that may be utilized in addition to adjusting frequency and voltage. In one embodiment, dispatch rate of instructions can be reduced in order to reduce power consumption of an execution unit. Note also that utilization information may be generated for sub-blocks. Thus, in an embodiment having three execution pipelines that have a combined utilization of, e.g., 30%, several options are available. The clocks to all of the execution pipelines can be reduced, e.g. by one half, to match the load. In another embodiment, several of the pipelines might be shut down while one pipeline is kept operating at full speed. In another embodiment, the clocks can be turned off while operations directed to a particular functional unit accumulate. Once a sufficient number have accumulated, the clocks can be turned back on and the accumulated operations can be executed in a burst mode, and then the clocks can be turned off again.

Thus, a more finely grained power management technique has been described that allows particular sections of an integrated circuit to be controlled independently from other sections to provide both effective power savings along with good performance. The power management techniques can include adjusting such parameters as clock rates, voltages, and dispatch rates.

The description of the invention set forth herein is illustrative, and is not intended to limit the scope of the invention as set forth in the following claims. For instance while operating system software has been described as performing aspects of the power management, any software, including application software, can incorporate the teachings herein. In addition, while the embodiments described herein have been described mostly with relation to a microprocessor, the power savings and performance approach described herein can be implemented in any integrated circuit or electronic device where both performance and power savings are considerations. Other variations and modifications of the embodiments disclosed herein, may be made based on the description set forth herein, without departing from the scope and spirit of the invention as set forth in the following claims.

What is claimed is:

[1. A method of controlling power consumption in an integrated circuit that includes a plurality of functional blocks, comprising:

generating respective block utilization information for the functional blocks included in the integrated circuit; and independently managing power of the respective functional blocks to match respective block utilization levels according to the respective block utilization information.]

[2. The method as recited in claim 1 wherein the operation of managing power includes independently adjusting frequency of clocks being respectively supplied to the functional blocks according to the block utilization information.]

[3. The method as recited in claim 1 wherein the operation of managing power includes adjusting a voltage being supplied to one of the functional blocks independently of voltages being supplied to other functional blocks according to the utilization information of the one functional block.]

[4. The method as recited in claim 1 wherein the operation of managing power includes adjusting dispatch rate of operations to at least a section of one of the functional blocks according to the block utilization information associated with the one functional block.]

[5. The method as recited in claim 1 wherein the block utilization information from one of the functional blocks provides an indication of what percentage of time the one functional block is being used.]

[6. The method as recited in claim 1 wherein the block utilization information from one of the functional blocks provides dispatch information relating to how many operations have been dispatched to or within the functional block.]

[7. The method as recited in claim 1 wherein the functional blocks include at least one of a fixed point unit, an arithmetic logic unit, a floating point unit, a barrel shifter, a load/store unit, a memory controller, an input/output interface unit and a cache.]

[8. The method as recited in claim 1 wherein the utilization information indicates how much time the functional block spends idling.]

[9. The method as recited in claim 1 further comprising monitoring block utilization on a task basis.]

[10. The method as recited in claim 9 further comprising adjusting power consumption of at least one of the functional blocks when a task switch occurs from a first task to a second task according to the block utilization information for the one functional block corresponding to the second task.]

[11. The method as recited in claim 1 further comprising:
reading utilization information from a utilization register associated with one of the functional blocks; and
adjusting power usage of the one functional block according to the utilization information read.]

[12. The method as recited in claim 1 further comprising comparing utilization information related to one of the blocks to at least one threshold value to determine whether to adjust power usage.]

[13. The method as recited in claim 1 further comprising:
adjusting the frequency of a first clock being supplied to one of the functional blocks upward, when first utilization information for the one block is above a first threshold; and
adjusting the frequency of the first clock downward when the first utilization information for the one block is below a second threshold.]

[14. The method as recited in claim 1 further periodically checking utilization information for a plurality of the functional blocks.]

[15. The method as recited in claim 1 further comprising checking utilization information on a periodic basis for at least one of the functional blocks to determine whether to adjust power consumption of the one functional block to reflect current utilization information.]

[16. An integrated circuit comprising:
a plurality of functional blocks;
utilization circuits respectively associated with the functional blocks coupled to provide block utilization information of the functional blocks; and wherein
the integrated circuit is responsive to the block utilization information to independently adjust power consumption levels of the functional blocks to match respective block utilization levels.]

[17. The integrated circuit as recited in claim 16 wherein at the power consumption levels of the functional blocks are determined at least in part by independently adjustable clock frequencies of respective clocks being supplied to the functional blocks.]

[18. The integrated circuit as recited in claim 17 wherein the power consumption levels of the functional blocks are determined at least in part according to independently controllable voltages being supplied to respective ones of the functional blocks.]

[19. The integrated circuit as recited in claim 16 further comprising:
a clock control circuit coupled to independently adjust the frequency of respective clocks being supplied to the functional blocks.]

[20. The integrated circuit as recited in claim 16 further comprising registers associated with respective utilization circuits of the functional blocks containing block utilization information.]

[21. The integrated circuit as recited in claim 16 wherein the utilization circuits are software accessible.]

[22. The integrated circuit as recited in claim 16 further including software operable on the integrated circuit to read utilization information of a selected functional block and to control at least one power performance parameter of the selected functional block in response thereto.]

[23. A computer system comprising:
an integrated circuit that includes a plurality of functional blocks;
utilization circuits respectively associated with the functional blocks and coupled to provide block utilization information of the functional blocks; and
a computer program including an instruction sequence executable by the integrated circuit to adjust power consumption levels of the functional blocks to match respective block utilization levels according to the block utilization information.]

[24. The computer system as recited in claim 23 wherein the computer program tracks utilization information for each of the functional blocks on a task basis.]

[25. The computer system as recited in claim 24 wherein the computer program is responsive to a task switch from a first task to a second task to adjust power management parameters for one or more of the functional blocks according to utilization information corresponding to the second task.]

[26. An electronic system comprising:
an integrated circuit including a plurality of functional blocks;
means for determining respective block utilization information of the functional blocks; and
means for adjusting power consumption of the respective functional blocks to match respective block utilization levels according to the respective block utilization information.]

[27. The method of claim 1, wherein the independently managing power of the respective block functional blocks to match respective block utilization levels comprises:
increasing power consumption levels for those functional blocks with utilization information that indicates increased utilization; and
decreasing power consumption levels for those functional blocks with utilization information that indicates decreased utilization.]

*28. An integrated circuit comprising:*
*a plurality of functional blocks;*
*utilization circuits respectively coupled to the functional blocks to provide block utilization information of the functional blocks, the block utilization information indicating a utilization rate of a corresponding functional block, and wherein a block utilization level of the corresponding functional block is based at least in part on the utilization rate; and*
*wherein the integrated circuit, responsive to the block utilization information, independently adjusts power consumption levels of each of the functional blocks to match respective block utilization levels,*
*wherein a power consumption level of a selected functional block is increased in response to the utilization rate of the selected functional block being greater than a first threshold,*
*wherein the power consumption level of the selected functional block is decreased in response to the utilization rate of the selected functional block being less than a second threshold,*

*wherein the power consumption level of the selected functional block is adjusted by changing a power consumption parameter of the selected functional block, and*

*wherein the second threshold is different from the first threshold.*

*29. The integrated circuit of claim 28, wherein:*

*each of the utilization circuits comprises a timer to set a monitoring time period at which the block utilization level for a respective functional block is checked, and*

*the monitoring time period is different for one or more timers.*

*30. The integrated circuit of claim 28, wherein the power consumption parameter comprises a clock frequency associated with the selected functional block, a voltage supplied to the selected functional block, a dispatch rate of operations associated with the selected functional block, or a combination thereof.*

*31. The integrated circuit of claim 28, wherein the power consumption parameter comprises a clock frequency derived from a clock divider circuit operable to provide a base clock frequency or a fraction of the base clock frequency.*

*32. An integrated circuit comprising:*

*a plurality of functional blocks;*

*utilization circuits respectively coupled to the functional blocks to provide block utilization information of the functional blocks, wherein the block utilization information represents activity in each of the functional blocks as measured over a period of time, and*

*wherein each of the utilization circuits comprises:*

*a utilization detection circuit to detect a utilization event;*

*a utilization counter to count a number of utilization events; and*

*a cycle counter to count to a value equal to the period of time;*

*wherein the integrated circuit, responsive to the block utilization information, independently adjusts power consumption levels of the of the functional blocks to match respective block utilization levels according to the block utilization information,*

*wherein one or more of the block utilization levels are based at least in part on the number of utilization events counted by the utilization counter over the period of time,*

*wherein, in response to an increase in a block utilization level for a respective functional block, a clock frequency of the respective functional block is increased to a first frequency value, and*

*wherein, in response to a decrease in the block utilization level for the respective functional block, the clock frequency of the respective functional block is decreased to a second frequency value, the first and second frequency values being different from one another and each greater than zero hertz.*

*33. The integrated circuit of claim 32, wherein the clock frequency increases or decreases in step adjustments.*

*34. The integrated circuit of claim 32, wherein the clock frequency of the respective functional block is increased to the first frequency value or decreased to the second frequency value without changing a clock frequency of another functional block.*

*35. The integrated circuit of claim 32, wherein:*

*the first frequency value matches a first block utilization level associated with a first load of the respective functional block; and*

*the second frequency matches a second block utilization level associated with a second load of the respective functional block, wherein the first load is greater than the second load.*

*36. The integrated circuit of claim 32, wherein:*

*in response to the increase in the block utilization level for the respective functional block, a power supply voltage of the respective functional block is increased to a first voltage value, and*

*in response to the decrease in the block utilization level for the respective functional block, the power supply voltage of the respective functional block is decreased to a second voltage value, the first and second voltage values being different from one another and each greater than zero volts.*

*37. The integrated circuit of claim 32, wherein:*

*in response to the increase in the block utilization level for the respective functional block, a dispatch rate of operations issued to the respective functional block is increased to a first dispatch rate value, and*

*in response to the decrease in the block utilization level for the respective functional block, the dispatch rate of operations issued to the respective functional block is decreased to a second dispatch rate value, the first and second dispatch rate values being different from one another and each greater than zero.*

*38. An integrated circuit comprising:*

*a plurality of functional blocks; and*

*utilization circuits respectively coupled to the functional blocks to provide block utilization information of the functional blocks, wherein the integrated circuit, responsive to the block utilization information, independently adjusts power consumption levels of the functional blocks to match respective block utilization levels,*

*wherein a clock frequency and a power supply voltage of a selected functional block and a dispatch rate of a first set of operations dispatched to or within the selected functional block are increased in response to an increase in the block utilization level associated with the selected functional block, and*

*wherein the clock frequency and the power supply voltage of the selected functional block and the dispatch rate of a second set of operations dispatched to or within the selected functional block are decreased in response to a decrease in the block utilization level associated with the selected functional block.*

*39. The integrated circuit of claim 38, wherein the block utilization information represents activity in each of the functional blocks as measured over a period of time, and wherein each of the utilization circuits comprises:*

*a utilization detection circuit to detect a utilization event;*

*a utilization counter to count a number of utilization events; and*

*a cycle counter to count to a value equal to the period of time.*

*40. The integrated circuit of claim 39, wherein the period of time is different for one or more functional blocks.*

*41. The integrated circuit of claim 38, wherein the clock frequency of the selected functional block is increased or decreased without changing a clock frequency of another functional block.*

*42. The integrated circuit of claim 38,*

*wherein, in response to the increase in the block utilization level associated with the selected functional block,*

*the clock frequency is increased to a first frequency value and the power supply voltage is increased to a first voltage value,*

*wherein, in response to the decrease in the block utilization level associated with the selected functional block, the clock frequency is decreased to a second frequency value and the power supply voltage is decreased to a second voltage value, and wherein:*

*the first frequency value matches a first block utilization level associated with a first load of the selected functional block; and*

*the second frequency matches a second block utilization level associated with a second load of the selected functional block, wherein the first load is greater than the second load.*

* * * * *